(12) United States Patent
Dacosta-Mallet et al.

(10) Patent No.: US 10,632,879 B2
(45) Date of Patent: Apr. 28, 2020

(54) HEATING AND/OR COOLING DEVICE FOR A MOTOR VEHICLE SEAT

(71) Applicant: Faurecia Sieges D'Automobile, Nanterre (FR)

(72) Inventors: Anne Isabelle Dacosta-Mallet, Etrechy (FR); Samuel Baudu, Boulogne Billancourt (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 14/820,175

(22) Filed: Aug. 6, 2015

(65) Prior Publication Data

US 2016/0039321 A1    Feb. 11, 2016

(30) Foreign Application Priority Data

Aug. 8, 2014    (FR) ...................... 14 57708

(51) Int. Cl.
*B60N 2/56* (2006.01)
*H05B 3/36* (2006.01)
*H05B 3/00* (2006.01)

(52) U.S. Cl.
CPC ......... *B60N 2/5692* (2013.01); *B60N 2/5678* (2013.01); *B60N 2/5685* (2013.01); *H05B 3/0014* (2013.01); *H05B 3/36* (2013.01)

(58) Field of Classification Search
CPC .. B60N 2/5678; B60N 2/5685; B60N 2/5692; H05B 3/0014; H05B 3/36; H05B 2203/004; H05B 2203/029; H05B 3/342; H05B 2203/002; H05B 2203/014
See application file for complete search history.

(56) References Cited

U.S. PATENT DOCUMENTS

| 2,938,570 | A |   | 5/1960  | Flajole |                       |
|-----------|---|---|---------|---------|-----------------------|
| 3,330,598 | A |   | 7/1967  | Whiteside |                     |
| 4,413,857 | A | * | 11/1983 | Hayashi | ........... A47C 7/74 |
|           |   |   |         |         | 297/180.11            |
| 4,590,359 | A | * | 5/1986  | Mobius  | ........... A47C 7/748 |
|           |   |   |         |         | 219/202               |
| 4,697,064 | A | * | 9/1987  | Altmann | .......... B60N 2/5685 |
|           |   |   |         |         | 219/202               |
| 4,946,220 | A | * | 8/1990  | Wyon    | ........... A47C 7/74  |
|           |   |   |         |         | 297/180.13            |
| 4,969,684 | A |   | 11/1990 | Zarotti |                       |

(Continued)

FOREIGN PATENT DOCUMENTS

| CA | 2911134 | 5/2016 |
|----|---------|--------|
| CA | 2940929 | 3/2017 |

(Continued)

OTHER PUBLICATIONS

"French Search Report," issued in counterpart French patent application No. FR 14/57708, dated Mar. 27, 2015.

(Continued)

*Primary Examiner* — Frantz F Jules
*Assistant Examiner* — Martha Tadesse
(74) *Attorney, Agent, or Firm* — Barnes & Thornburg LLP

(57) ABSTRACT

A motor vehicle seat element successively including: a pad; a heating and/or cooling device including at least one heat and/or cold generation element and at least one heat and/or cold diffusion layer; and a cover.

20 Claims, 3 Drawing Sheets

(56) References Cited

U.S. PATENT DOCUMENTS

| | | | |
|---|---|---|---|
| 5,138,851 A | 8/1992 | Mardikian | |
| 5,765,915 A | 6/1998 | Lee | |
| 6,064,037 A * | 5/2000 | Weiss | A47C 7/74 |
| | | | 219/217 |
| 6,230,501 B1 | 5/2001 | Bailey | |
| 6,486,452 B2 | 11/2002 | Loyd, Sr. | |
| 6,988,770 B2 * | 1/2006 | Witchie | B60N 2/5628 |
| | | | 297/180.12 |
| 7,131,187 B2 | 11/2006 | Check | |
| 7,183,519 B2 | 2/2007 | Horiyama | |
| 7,478,869 B2 | 1/2009 | Lazanja | |
| 7,587,901 B2 | 9/2009 | Petrovski | |
| 7,708,338 B2 | 5/2010 | Wolas | |
| 8,066,324 B2 | 11/2011 | Nathan | |
| 8,222,511 B2 | 7/2012 | Lofy | |
| 8,316,650 B2 | 11/2012 | Yang | |
| 8,393,162 B2 | 3/2013 | Chung | |
| 8,397,518 B1 | 3/2013 | Vistakula | |
| 8,495,974 B2 | 7/2013 | Agosta | |
| 8,882,142 B2 | 11/2014 | Lamesch | |
| 8,969,703 B2 | 3/2015 | Makansi | |
| 8,979,191 B2 | 3/2015 | Friderich | |
| 9,022,464 B2 | 5/2015 | Feng | |
| 9,105,808 B2 | 8/2015 | Petrovski | |
| 9,105,809 B2 | 8/2015 | Lofy | |
| 9,335,073 B2 | 5/2016 | Lofy | |
| 9,676,310 B2 | 6/2017 | Fitzpatrick | |
| 10,179,526 B2 | 1/2019 | Marquette | |
| 2001/0011601 A1 | 8/2001 | Renaud | |
| 2002/0185483 A1 * | 12/2002 | Check | B29C 65/02 |
| | | | 219/217 |
| 2003/0230913 A1 | 12/2003 | Buss | |
| 2004/0100131 A1 | 5/2004 | Howick | |
| 2004/0160092 A1 | 8/2004 | Laib | |
| 2004/0222684 A1 | 11/2004 | Vansickle | |
| 2004/0238516 A1 * | 12/2004 | Bulgajewski | B60N 2/5678 |
| | | | 219/217 |
| 2005/0066505 A1 | 3/2005 | Iqbal | |
| 2005/0140189 A1 | 6/2005 | Bajic | |
| 2005/0184565 A1 | 8/2005 | Weiss | |
| 2005/0200166 A1 * | 9/2005 | Noh | B60N 2/5642 |
| | | | 297/180.14 |
| 2005/0253425 A1 | 11/2005 | Asada | |
| 2006/0027552 A1 | 2/2006 | Krobok | |
| 2006/0130490 A1 | 6/2006 | Petrovski | |
| 2006/0175877 A1 * | 8/2006 | Alionte | A47C 7/74 |
| | | | 297/180.14 |
| 2006/0267260 A1 * | 11/2006 | Stowe | B60N 2/5621 |
| | | | 267/143 |
| 2007/0001507 A1 * | 1/2007 | Brennan | A47C 7/74 |
| | | | 297/452.42 |
| 2007/0035162 A1 * | 2/2007 | Bier | B60H 1/00285 |
| | | | 297/180.15 |
| 2007/0084220 A1 | 4/2007 | Asada | |
| 2007/0277313 A1 | 12/2007 | Terech | |
| 2008/0315634 A1 * | 12/2008 | Hartmann | B60N 2/5635 |
| | | | 297/180.14 |
| 2009/0001778 A1 * | 1/2009 | Nathan | B60N 2/5685 |
| | | | 297/180.12 |
| 2009/0121524 A1 | 5/2009 | Abe | |
| 2009/0134675 A1 * | 5/2009 | Pfahler | B60N 2/5635 |
| | | | 297/180.1 |
| 2009/0134677 A1 * | 5/2009 | Maly | B60N 2/5635 |
| | | | 297/180.14 |
| 2009/0205695 A1 | 8/2009 | Makansi | |
| 2010/0288370 A1 | 11/2010 | Volden | |
| 2010/0327636 A1 | 12/2010 | Stoll | |
| 2011/0109128 A1 | 5/2011 | Axakov | |
| 2011/0226299 A1 | 9/2011 | Makansi | |
| 2012/0032478 A1 | 2/2012 | Friderich | |
| 2012/0079837 A1 | 4/2012 | Maranville | |
| 2012/0080911 A1 | 4/2012 | Brykalski | |
| 2012/0198616 A1 | 8/2012 | Makansi | |
| 2013/0008181 A1 | 1/2013 | Makansi | |
| 2013/0097777 A1 | 4/2013 | Marquette | |
| 2013/0106147 A1 | 5/2013 | Lazanja | |
| 2013/0119717 A1 | 5/2013 | Gong | |
| 2013/0214583 A1 | 8/2013 | Uramichi | |
| 2014/0182063 A1 * | 7/2014 | Crawford | C09K 5/14 |
| | | | 5/636 |
| 2015/0048658 A1 | 2/2015 | Gawade | |
| 2015/0241147 A1 * | 8/2015 | Brooks | F28F 21/02 |
| | | | 165/185 |
| 2016/0021705 A1 | 1/2016 | Barfuss | |
| 2016/0039321 A1 | 2/2016 | Dacosta-Mallet | |
| 2016/0052362 A1 | 2/2016 | Thomas | |
| 2016/0133817 A1 | 5/2016 | Makansi | |
| 2016/0152167 A1 | 6/2016 | Kozlowski | |
| 2016/0304013 A1 | 10/2016 | Wolas | |
| 2016/0332549 A1 | 11/2016 | Marquette | |
| 2017/0066355 A1 | 3/2017 | Kozlowski | |
| 2017/0164757 A1 | 6/2017 | Thomas | |
| 2017/0181225 A1 | 6/2017 | Inaba | |
| 2017/0232873 A1 | 8/2017 | Hall | |
| 2017/0305312 A1 | 10/2017 | Haller | |
| 2017/0354190 A1 | 12/2017 | Cauchy | |
| 2018/0111527 A1 | 4/2018 | Tait | |
| 2018/0272836 A1 | 9/2018 | Humer | |
| 2018/0281641 A1 | 10/2018 | Durkee | |

FOREIGN PATENT DOCUMENTS

| | | |
|---|---|---|
| DE | 202011004140 U1 | 8/2012 |
| EP | 0345806 A2 | 12/1989 |
| EP | 2631114 A1 | 8/2013 |
| EP | 3111904 A1 | 1/2017 |
| JP | 2006021600 | 1/2006 |
| JP | 2013198730 | 10/2013 |
| KR | 1020020062289 A | 7/2002 |
| KR | 1020070051116 A | 5/2007 |
| KR | 101154518 B1 | 6/2012 |
| KR | 20120064814 | 6/2012 |
| KR | 101565107 | 11/2015 |
| WO | 2006117690 | 11/2006 |
| WO | 2007020526 | 2/2007 |
| WO | 2008023942 | 2/2008 |
| WO | 2008103742 | 8/2008 |
| WO | 2010108254 | 9/2010 |
| WO | 2012037031 A1 | 3/2012 |
| WO | 2014052145 | 4/2014 |
| WO | 2015044725 | 4/2015 |
| WO | 2015085150 | 6/2015 |
| WO | 2015123585 | 8/2015 |
| WO | 2016077843 | 5/2016 |

OTHER PUBLICATIONS

Chinese Office Action for Chinese App. No. 201380053428.6 dated Dec. 5, 2016, 3368 1.CN II, 10 pages.
Office Action for Chinese Patent Application No. 201380053428.6, dated Jun. 30, 2016 including English language summary, 13 pages.
PCT Search Report and Written Opinion completed on Jan. 29, 2014 and issued in connection with PCT/US2013/060549.
International (PCT) Search Report and Written Opinion completed on Jun. 17, 2016 for International (PCT) App. No. PCT/US2016/019743, 19 pages.
PCT Search Report and Written Opinion completed on Feb. 10, 2014 and issued in connection with PCT/US2013/060864.
Korean Notice of Preliminary Rejection for Korean App. No. 10-2015-7010107 dated Jul. 9, 2019, 3368 KR II, 23 pages.
Office Action dated Sep. 4, 2019 for U.S. Appl. No. 15/787,161, 4156 US-U II, (pp. 1-12).

* cited by examiner

HEATING AND/OR COOLING DEVICE FOR A MOTOR VEHICLE SEAT

The present patent application claims the priority benefit of French patent application FR14/57708, filed Aug. 8, 2014, the contents of which are incorporated herein by reference in its entirety to the maximum extent allowable by law.

The present disclosure generally relates to motor vehicle seats and, more particularly, to the forming of a heating and/or cooling device for such a seat.

Motor vehicle seats are more and more often equipped with heating and/or cooling devices (heating and/or cooling mats). Such mats may be elements interposed between a padding and a cover of the seat element (seat bottom piece, backrest or headrest) or may be integrated in the padding, for example, by being overmolded.

The heat and/or cold generation elements forming the heating and/or cooling devices generally are electric elements, typically heating resistors or Peltier-effect elements. They may also be devices having a heat and/or cold-carrying fluid flowing therethrough.

It would be desirable to improve the performance of heating and/or cooling devices fitting motor vehicle seats.

Thus, an embodiment aims at providing a motor vehicle seat heating and/or cooling device which overcomes all or part of the disadvantages of usual thermal devices.

Another embodiment aims at improving the performance of such heating and/or cooling devices.

Another embodiment aims at a solution requiring no modification of seat assembly techniques.

Another embodiment aims at a solution which requires no modification of the circuits for controlling the heat and/or cold generation elements.

Thus, an embodiment provides a motor vehicle seat element successively comprising:
a padding;
a heating and/or cooling device comprising at least one heat and/or cold generation element and at least one heat and/or cold diffusion layer; and
a cover.

An advantage is to improve the performance of a heating and/or cooling device fitting a seat element.

According to an embodiment, the heat and/or cold diffusion layer is at least partially interposed between the padding and the heat and/or cold generation element.

According to an embodiment, the heat and/or cold diffusion layer extends more widely than just above the heat generation element.

An advantage is to improve the heat distribution by giving access to areas of the seat element which do not enable to provide a heat and/or cold generation element.

According to an embodiment, the heat and/or cold diffusion layer is perforated.

An advantage is to avoid for moisture to build up at the level of the cover.

According to an embodiment, the heat and/or cold diffusion layer is made of graphite.

An advantage is to provide a heat and/or cold accumulator effect.

According to an embodiment a thermally reflective layer is provided in addition to the diffusion layer.

According to an embodiment, this reflective layer is made of aluminum.

According to an embodiment, the seat element comprises a plurality of heat and/or cold generation elements formed of Peltier-effect elements.

An advantage is to be able to heat up or cool down.

According to an embodiment, the heat generation element is a heating resistor.

According to an embodiment, the heat and/or cold diffusion layer is formed of a stack of a plurality of layers.

An advantage is to improve the mechanical resistance, thus making the handling easier during the assembly.

An embodiment provides a seat comprising a seat element.

The foregoing and other features and advantages will be discussed in detail in the following non-limiting description of specific embodiments in connection with the accompanying drawings, among which:

Figure 1:
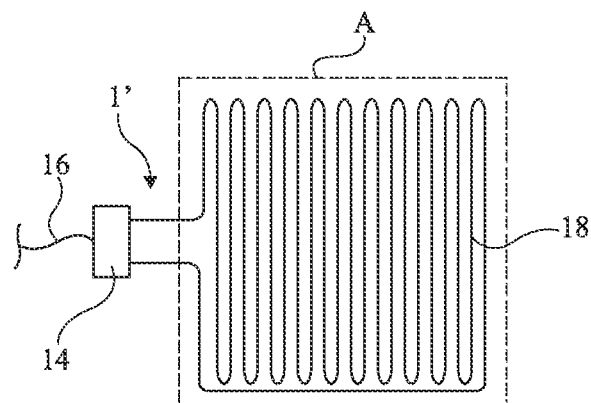
FIG. 1 is a simplified top view of a conventional heating device fitting a motor vehicle seat element.

For clarity, only those elements which are useful to the understanding of the embodiments which will be described have been shown and will be detailed. In particular, the forming of the seat elements (frame, padding, and cover) has not been detailed, the described embodiments being compatible with usual forms of seat elements equipped with heating and/or cooling elements. Further, devices for connecting the heat and/or cold generation elements to one or a plurality of power sources or control devices have not been detailed either, the described embodiments being, here again, compatible with usual implementations.

It should be noted that, in the drawings, the structural and/or functional elements common to the different embodiments may be designated with the same reference numerals and may have identical structural, dimensional, and material properties.

FIG. 1 is a simplified top view of a conventional heating device 1' fitting a motor vehicle seat element.

The case of a heating device formed of a heating resistor 18 arranged in the form of a serpentine on the padding (symbolized by a dotted pattern A) of the seating element (seat bottom piece, backrest, headrest) is arbitrarily considered. The ends of resistive element 18 are connected to a control and electric power supply circuit 14 communicating (connection 16) with power supply elements, not shown.

Saving power is an ever-increasing concern. Accordingly, a solution enabling to improve the performance of a heating and/or cooling device equipping a motor vehicle seat would be welcome.

In the following description, reference will be made hereafter to a heating device. However, all that will be described hereafter applies, unless otherwise specified, to a cooling device.

Figure 2:
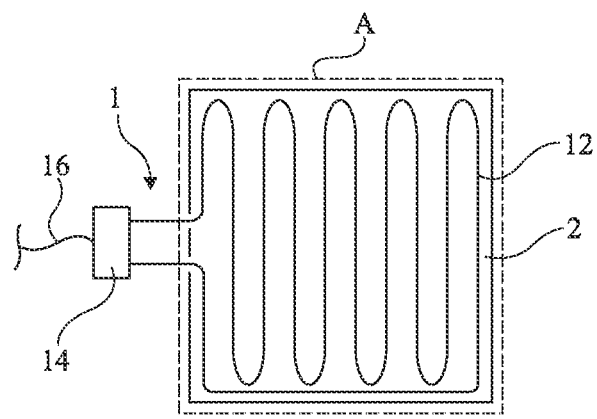
FIG. 2 is a simplified top view of an embodiment of a heating device fitting a motor vehicle seat element.

FIG. 2 is a simplified top view of an embodiment of a heating device fitting a motor vehicle seat element.

It shows a heat generation device 1, for example, in the form of one or a plurality of heating generation elements 12 (for example, one or a plurality of serpentine heating resistors). Element 12 is connected to a power supply device and control device 14 communicating (connection 16) with a power source. In the example of FIG. 2, heat generation element 12 is distributed all over the surface of the seat element.

According to this embodiment, a heat and/or cold diffusion layer 2 is interposed between element 12 and padding A having the heating (more generally heating and/or cooling) device placed thereon.

Figure 5:
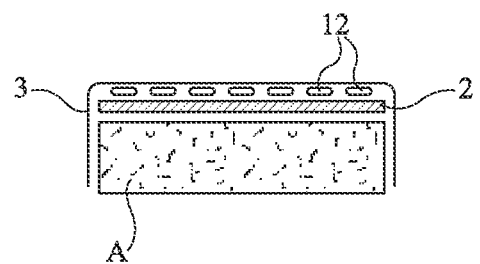
FIG. 5 is a cross-section view of an embodiment of a motor vehicle seat element.
Figure 6:
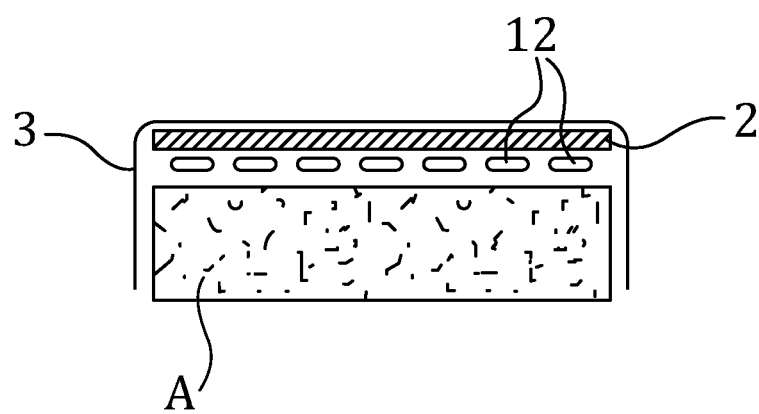
FIG. 6 is a cross-section view of another embodiment of a motor vehicle seat element.

According to an embodiment, layer 2 is a layer of a non-reflective heat diffusion material, for example, a graphite layer. In this case, layer 2 may indifferently be placed between the padding and the heat generation elements, as shown in FIG. 5, or between the latter and the cover, as shown in FIG. 6.

Preferably, layer 2 is made of Graphite, which can be, thanks to its anisotropic properties, a better thermal conductor than other material like copper or Aluminum.

Graphite is a stack of layers made of Graphene.

Figure 3:
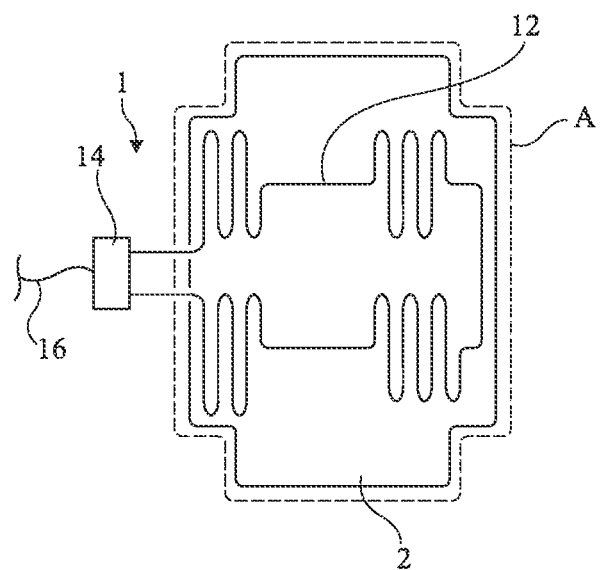
FIG. 3 is a simplified top view of another embodiment of a heating device fitting a motor vehicle seat element.

FIG. 3 is a simplified top view of an embodiment of another embodiment of a heating device equipping a motor vehicle seat element.

As compared with the embodiment of FIG. 2, heat generation elements 12 are located at different locations of the seat element and heat and/or cold diffusion layer 2 extends more widely than just above heat generation elements 12.

This embodiment highlights an advantage of the use of a diffusion layer 2, which is to allow a thermal diffusion in seat areas where the shape of the padding does not enable to provide heat and/or cold generation elements or makes it difficult.

Figure 4:
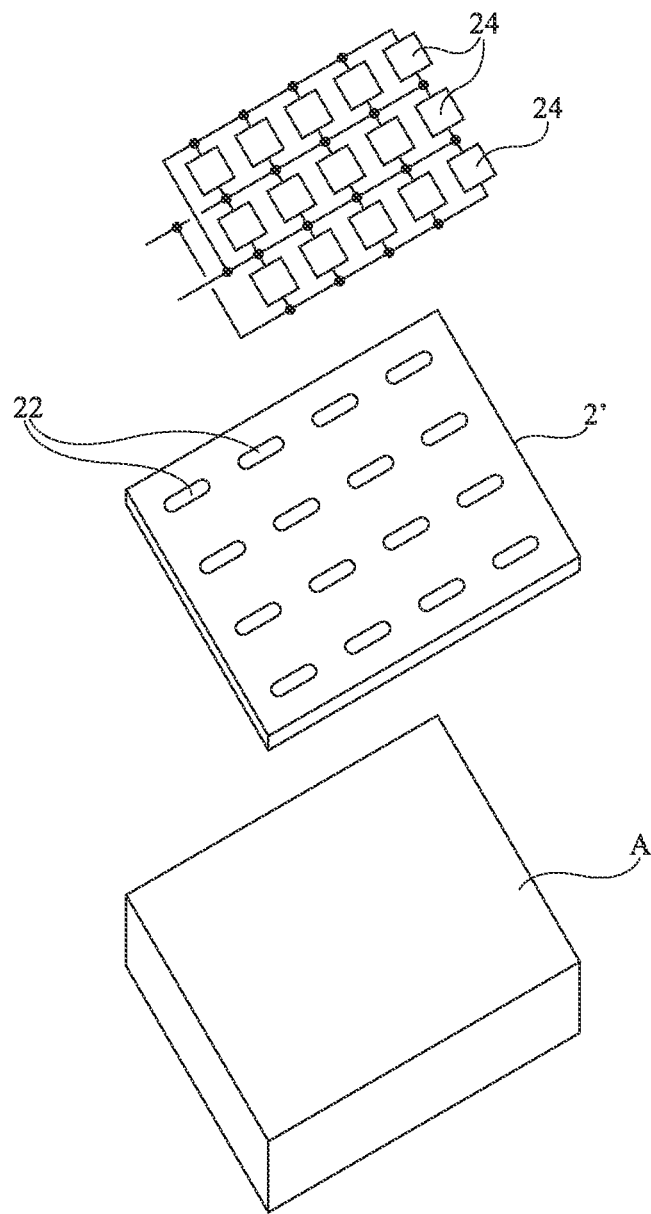
FIG. 4 is a simplified exploded perspective view of a seat element for a motor vehicle, fitted with an embodiment of a heating and/or cooling device.

FIG. 4 is a simplified exploded perspective view of a seat element for a motor vehicle, fitted with another embodiment of a heating and/or cooling device.

As compared with the previous embodiments, diffusion layer 2' comprises holes 22. The function of holes 22 is to avoid for moisture to build up at the level of the cover. Thus, this embodiment is more particularly intended for the case where the material forming diffusion layer 2' is tight.

FIG. 4 also illustrates another embodiment of the heat and/or cold generation elements, here in the form of a network of Peltier-effect elements 24. Such an embodiment enables, according to the current flow direction imposed through elements 24, to obtain a heating or cooling effect.

FIG. 5 is a cross-section view of an embodiment of motor vehicle seat element.

FIG. 5 shows padding A topped with a heat and/or cold diffusion layer 2 and with heat and/or cold generation elements 12, the assembly being covered with a cover 3.

According to an alternative embodiment, the diffusion layer is formed of a stack of a plurality of layers or of a multilayer to improve the mechanical resistance and make the assembly easier.

The heating and/or cooling device is assembled either by being interposed between the padding and the cover or by being overmolded on the padding.

The fact of interposing a heating and/or cooling diffusion layer has many advantages.

First, this improves the performance of the heating and/or cooling device and decreases power needs.

Further, the heating and/or cooling diffusion layer will generally be thinner than the heat and/or cold generation elements and will thus provide access to areas of the seat element which are otherwise not accessible.

Another advantage of the described embodiments is that they require no modification of the techniques for manufacturing the padding or the cover, or of the assembly techniques.

Another advantage is to require no modification of the circuits for controlling the heat and/or cold generation elements and their power sources.

According to the nature of the heat generation elements and to the nature of the heat and/or cold diffusion layer, they may be provided to be directly in contact (preferred embodiment) or not. Similarly, the heating and/or cooling device is, preferably, placed as close as possible to the cover to avoid losses between the device and the person occupying the seat.

Various specific embodiments have been described. Various alterations, modifications, and improvements will occur to those skilled in the art. In particular, a plurality of heat and/or cold generation elements (a plurality of heating resistors, a plurality of Peltier-effect elements, a plurality of ducts conveying a heat-carrying fluid) may be provided and associated with one or a plurality of heat and/or cold diffusion layer. Furthermore one or a plurality of reflective, preferably made of aluminum, can be added to the diffusion layer. Further, the different embodiments and variations may be combined. Finally, the practical implementation of the described embodiments is within the abilities of those skilled in the art based on the functional indications given hereabove.

The invention claimed is:

1. A motor vehicle seat element successively comprising:
   a padding;
   a heating and cooling device comprising at least one heat and cold generation element and a diffusion layer; wherein the diffusion layer comprises at least one layer of graphite;
   a metallic thermally reflective layer; and
   a cover, and
   wherein the diffusion layer is formed of a stack of a plurality of layers,
   wherein the cover is arranged around the at least one heat and cold generation element and the diffusion layer is located between the at least one heat and cold generation element and a portion of the cover.

2. The motor vehicle seat element of claim 1, wherein the diffusion layer is at least partially interposed between the padding and the heat and cold generation element.

3. The motor vehicle seat element of claim 1, wherein the diffusion layer is perforated.

4. The motor vehicle seat element of claim 1, comprising a plurality of heat and cold generation elements formed of Peltier-effect elements.

5. The motor vehicle seat element of claim 1, wherein the metallic thermally reflective layer comprises aluminum.

6. A motor vehicle seat element comprising
   a seat padding,
   a heating and cooling device configured to selectively heat and cool an occupant supported on the motor vehicle seat element, the heating and cooling device including at least one heat and cold generation element, a graphene-based diffusion layer, and a metallic layer, and
   a cover arranged to extend around the seat padding,
   wherein the graphene-based diffusion layer is located between the cover and the at least one heat and cold generation element.

7. The motor vehicle seat element of claim 6, wherein the metallic layer is coupled to the graphene-based diffusion layer.

8. The motor vehicle seat element of claim 7, wherein the metallic layer comprises aluminum.

9. The motor vehicle seat element of claim 7, wherein the graphene-based diffusion layer is formed of a stack of a plurality of layers.

10. The motor vehicle seat element of claim 7, wherein the graphene-based diffusion layer comprises graphite.

11. The motor vehicle seat element of claim 7, wherein the at least one heat and cold generation element comprises a Peltier-effect element.

12. The motor vehicle seat element of claim 11, wherein the graphene-based diffusion layer extends more widely than above the Peltier-effect element.

13. The motor vehicle seat element of claim 6, wherein the cover is arranged around the at least one heat and cold generation element.

14. The motor vehicle seat element of claim 6, wherein the cover is arranged around the heating and cooling device.

15. The motor vehicle seat element of claim 6, wherein the at least one heat and cold generation element comprises a Peltier-effect element, the graphene-based diffusion layer is formed of a stack of a plurality of layers, the graphene-based diffusion layer extends more widely than above the Peltier-effect element, the metallic layer is coupled to the graphene-based diffusion layer, and the metallic layer comprises aluminum.

16. The motor vehicle seat element of claim 1, wherein the at least one heat and cold generation element comprises a Peltier-effect element, the metallic thermally reflective layer is coupled to the diffusion layer, the metallic thermally reflective layer comprises aluminum, and the diffusion layer is perforated.

17. A motor vehicle seat element comprising
a cover formed to define an interior space,
a seat padding located in the interior space,
a heating and cooling device including a heat and cold generation Peltier-effect element configured to heat and cool selectively an occupant supported on the motor vehicle seat element according to a current flow direction imposed through the heat and cold generation Peltier-effect element, a graphene-based diffusion layer, and a metallic layer and wherein the heat and cold generation Peltier-effect element, the graphene-based diffusion layer, and the metallic layer are located in the interior space defined by the cover.

18. The motor vehicle seat element of claim 17, wherein the graphene-based diffusion layer is formed of a stack of a plurality of layers made from graphene.

19. The motor vehicle seat element of claim 18, wherein the graphene-based diffusion layer is located between the cover and the heat and cold generation Peltier-effect element.

20. The motor vehicle seat element of claim 19, wherein the metallic layer is coupled to the graphene-based diffusion layer.

* * * * *